US009778451B2

(12) United States Patent
Shibata

(10) Patent No.: US 9,778,451 B2
(45) Date of Patent: Oct. 3, 2017

(54) MICROSCOPE SYSTEM

(71) Applicant: OLYMPUS CORPORATION, Tokyo (JP)

(72) Inventor: Motohiro Shibata, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 143 days.

(21) Appl. No.: 14/696,832

(22) Filed: Apr. 27, 2015

(65) Prior Publication Data

US 2015/0338632 A1    Nov. 26, 2015

(30) Foreign Application Priority Data

May 22, 2014    (JP) ................................ 2014-106125

(51) Int. Cl.
G02B 21/36        (2006.01)
H04N 5/357        (2011.01)
G06T 5/00         (2006.01)

(52) U.S. Cl.
CPC ......... *G02B 21/367* (2013.01); *G02B 21/365* (2013.01); *G02B 21/368* (2013.01); *G06T 5/002* (2013.01); *H04N 5/3572* (2013.01)

(58) Field of Classification Search
None
See application file for complete search history.

(56) References Cited

U.S. PATENT DOCUMENTS

| 8,577,171 B1* | 11/2013 | Mollon | G06T 5/006 250/310 |
| 8,675,988 B2* | 3/2014 | Chen | G06T 5/002 382/274 |
| 2007/0066967 A1 | 3/2007 | Sieckmann et al. | |
| 2010/0272334 A1* | 10/2010 | Yamada | G01N 1/312 382/128 |

(Continued)

FOREIGN PATENT DOCUMENTS

JP    2013-257422 A    12/2013

OTHER PUBLICATIONS

Extended European Search Report dated Sep. 29, 2015 from related European Application No. 15 16 4432.5.

*Primary Examiner* — Derek S Chapel
(74) *Attorney, Agent, or Firm* — Scully, Scott, Murphy & Presser, P.C.

(57) ABSTRACT

The invention provides a microscope system including a correction-gain storage portion that calculates a correction gain for performing shading correction of an image related to optical images of a specimen, obtained by a microscope, and stores specimen information indicating features of the specimen and optical information at the time of obtaining the image in association with the correction gain; a correction-gain selecting portion that selects the correction gain for use when performing the shading correction of the image to be corrected; and a correction portion that performs the shading correction of the image to be corrected, on the basis of the selected correction gain, wherein the correction-gain (Continued)

selecting portion selects, on the basis of the specimen information or a result of the shading correction with the plurality of correction gains, the correction gain to be used in the shading correction of the image to be corrected.

15 Claims, 5 Drawing Sheets

(56) References Cited

U.S. PATENT DOCUMENTS

| | | | | |
|---|---|---|---|---|
| 2012/0113242 | A1* | 5/2012 | Crandall | G02B 21/002 |
| | | | | 348/79 |
| 2013/0301121 | A1* | 11/2013 | Honda | G02B 21/06 |
| | | | | 359/388 |
| 2013/0329033 | A1* | 12/2013 | Shibata | H04N 5/2355 |
| | | | | 348/79 |
| 2014/0293035 | A1* | 10/2014 | Horie | G02B 21/367 |
| | | | | 348/79 |

* cited by examiner

FIG. 3A   STANDARD-VIEWING
          -FIELD IMAGE
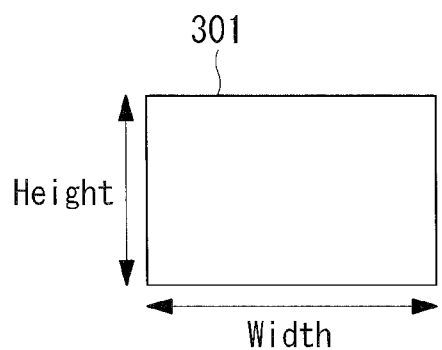
FIG. 3B   EDGE-VIEWING
          -FIELD IMAGE
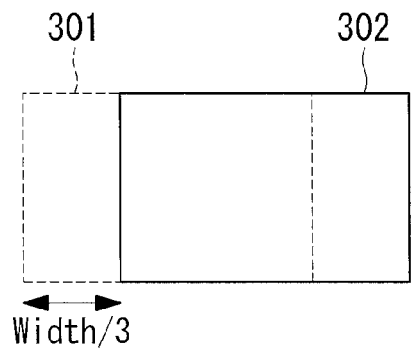
FIG. 3C
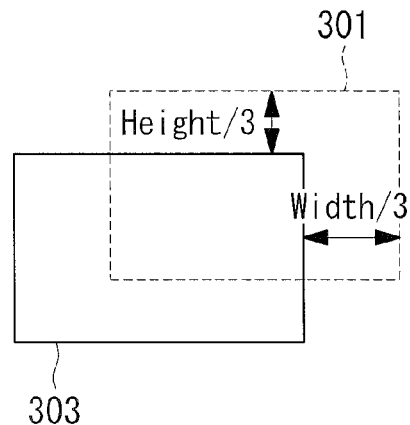

MICROSCOPE SYSTEM

TECHNICAL FIELD

This application is based on Japanese Patent Application No. 2014-106125, the contents of which are incorporated herein by reference.

The present invention relates to a microscope system.

BACKGROUND ART

There is a known virtual slide in which a plurality of sets of partial image data formed by acquiring images of parts of a specimen on a slide glass with a microscope at high resolution are connected together to obtain image data of the entire specimen, and this image data is displayed on a PC display or the like and can be observed as a microscope image.

In the case where an image is acquired in a microscope, shading occurs, which means brightness variations that arise due to variations in the light source, nonuniformity in the optical system, variations in the image-acquisition device and so forth. Shading becomes darker farther from the optical axis, and therefore, when a plurality of sets of partial image data are connected, as with a virtual slide, unnatural boundaries occur at the boundary areas in each set of partial image data, and the shading itself appears to be a pattern on the specimen.

In addition, shading has the property that it changes depending on the reflection and scattering characteristics of the specimen and therefore must be corrected for each specimen according to the characteristics of that specimen.

Therefore, there are microscope systems that prepare a correction gain, which is a shading correction value, in advance and perform shading correction on the basis of this correction gain. As an example of such a microscope system, Patent Literature 1 discloses an apparatus in which a correction gain is obtained on the basis of a change in brightness of an image in which a prescribed location on the specimen is acquired at the center of the viewing field and an image in which that same location is acquired at the edge of the viewing field, and shading correction is performed on the basis of the thus-obtained correction gain.

CITATION LIST

Patent Literature

{PTL 1}
Japanese Unexamined Patent Application, Publication No. 2013-257422

SUMMARY OF INVENTION

An aspect of the present invention provides a microscope system including a microscope that acquires an optical image of a specimen to obtain an image; a correction-gain calculating portion that calculates a correction gain for performing shading correction of the image obtained by the microscope; a correction-gain storage portion that stores specimen information indicating features of the specimen and optical information at the time of obtaining the image in association with the correction gain calculated by the correction-gain calculating portion; a correction-gain selecting portion that selects the correction gain for use when performing the shading correction of the image to be corrected, which is obtained by the microscope; and a correction portion that performs the shading correction of the image to be corrected, on the basis of the correction gain selected by the correction-gain selecting portion, wherein, in a case where a plurality of the correction gains associated with optical information in common with the optical information at the time of obtaining the image to be corrected are stored in the correction-gain storage portion, on the basis of the specimen information or correction results obtained by performing the shading correction with the plurality of correction gains, the correction-gain selecting portion selects, from the plurality of correction gains associated with the optical information in common with the optical information at the time of obtaining the image to be corrected, the correction gain to be used in the shading correction of the image to be corrected.

BRIEF DESCRIPTION OF DRAWINGS

FIG. 3A is an explanatory diagram showing an example of a standard-viewing-field image and an edge-viewing-field image.

FIG. 3B is an explanatory diagram showing an example of a standard-viewing-field image and an edge-viewing-field image.

FIG. 3C is an explanatory diagram showing an example of a standard-viewing-field image and an edge-viewing-field image.

DESCRIPTION OF EMBODIMENTS

First Embodiment

A microscope system according to a first embodiment of the present invention will be described below with reference to the drawings.

Figure 1:
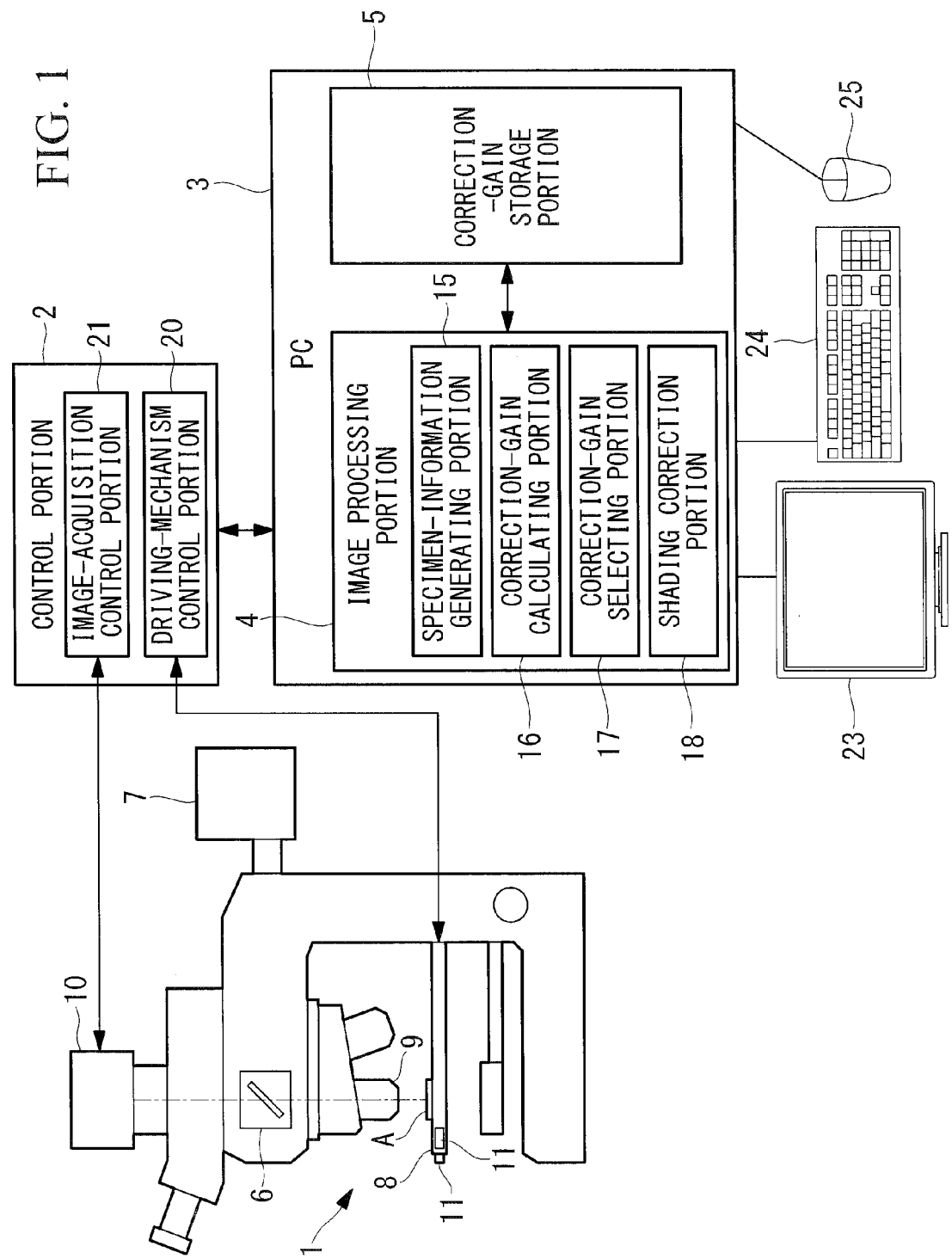
FIG. 1 is a block diagram showing the overall configuration of a microscope system according to a first embodiment of the present invention.

As shown in FIG. 1, the microscope system includes a microscope 1 that obtains an image by acquiring an optical image of a specimen A, a control portion 2 that controls the microscope 1, and a computer (PC) 3 that is connected to the control portion 2 and that functions as an image processing portion that performs prescribed processing on the image obtained by the microscope 1.

In the microscope 1, illumination light emitted from a light source 7 illuminates a specimen A mounted on a stage 8 via a half mirror 6, an optical image of the specimen A is formed on an image-acquisition surface of an image-acquisition portion 10 via an objective lens 9 and an image-forming lens which is not illustrated (optical system), and the image-acquisition portion 10 obtains this optical image as an image.

A motor 11 is provided on the stage 8 of the microscope 1, and by driving this motor 11 with a driving-mechanism control portion 20, the specimen A mounted on the stage 8 is moved relative to the optical system formed of the objective lens 9 and the image-forming lens.

The stage 8 is driven in directions perpendicular to the optical axis of the objective lens 9 (two directions, for example, the X direction and the Y direction) by driving the motor 11 with the driving-mechanism control portion 20, and as a result, the specimen A and the optical system, and thus the image-acquisition portion 10, can be moved relative to each other. By moving the specimen A and the image-acquisition portion 10 relative to each other, the position that is illuminated by the light from the light source 7 and the image formed on the image-acquisition device in the image-acquisition portion 10 move.

The image-acquisition portion 10, which is a digital camera that is provided with an image-acquisition device such as a CCD, a CMOS device, or the like, acquires the optical image formed thereon, and outputs the acquired image to an image-acquisition control portion 21 in the control portion 2 in the form of a digital image. The image-acquisition portion 10 is controlled by the image-acquisition control portion 21. The image-acquisition control portion 21 sets image-acquisition conditions in the image-acquisition portion 10, such as an exposure time, ISO sensitivity, and the like, in accordance with an instruction from the computer 3, to be described later, performs development processing on the acquired image, and outputs the image that has been subjected to development processing to the computer 3.

The control portion 2 includes the image-acquisition control portion 21, which controls the image-acquisition portion 10, and a driving-mechanism control portion 20 that controls the stage 8; the image-acquisition portion 10 is controlled by the image-acquisition control portion 21, and the stage 8 is controlled by the driving-mechanism control portion 20 so that a prescribed number of images are acquired at prescribed positions. More specifically, the control portion 2 controls the image-acquisition portion 10 and the stage 8 to acquire a standard-viewing-field image that serves as the image to be corrected and, when calculating the correction gain, to obtain a plurality of edge-viewing-field images with which a prescribed region at the center of the standard-viewing-field image overlaps and which are images of different viewing-field ranges, and outputs these obtained images to the image processing portion 4.

The computer 3, which includes a CPU (central processing unit) serving as a computational portion, performs prescribed image processing on the images input thereto from the image-acquisition control portion 21 and controls the control portion 2, a monitor 23, a keyboard 24, and a mouse 25, which are connected to the computer 3, in a unified manner. A general-purpose or special-purpose computer can be used as the computer 3, and the CPU executes image processing in which prescribed processing is performed on the image of the specimen A obtained by the image-acquisition portion 10, as well as various control programs. The computer 3 includes the image processing portion 4, which serves as a processing portion that is realized by the CPU loading and executing a prescribed program, and a correction-gain storage portion 5 that is connected to the image processing portion 4.

The image processing portion 4 includes a specimen-information generating portion 15, a correction-gain calculating portion 16, a correction-gain selecting portion 17, and a shading correcting portion 18.

As specimen information, the specimen-information generating portion 15 generates information indicating features of the image, such as a specimen name related to the image acquired by the image-acquisition portion 10, a histogram of pixel values of that image, the variance of the pixel values, and so forth.

The correction-gain calculating portion 16 calculates a correction gain for performing shading correction on the image obtained by the microscope 1. Calculation of the correction gain in the correction-gain calculating portion 16 is performed in the case where a correction gain suitable for shading correction of the image to be corrected does not exist in the correction-gain storage portion 5, or in the case where there is an instruction from the computer 3 to obtain a correction gain again.

The correction-gain calculating portion 16 stores the calculated correction gain in the correction-gain storage portion 5 in association with optical information at the time of obtaining the image for which the correction gain was calculated and the specimen information generated by the specimen-information generating portion 15. The optical information includes information related to the optical conditions at the time of obtaining the image, such as the microscopy method used in the microscope 1, the type of light source, the type of objective lens, and, in the case where the image-acquisition portion 10 is provided with a camera adapter or the like, the magnification thereof, at the time of acquiring the image for which this correction gain was calculated. Therefore, each time a correction gain is newly calculated by the correction-gain calculating portion 16, the correction-gain storage portion 5 stores the calculated correction gain, together with the optical information related to that image and the specimen information of that image, which is generated by the specimen-information generating portion 15, in association with each other. The stored correction gains serve as candidates at the time of correction gain selection performed by a correction-gain selecting portion 17, described below.

The correction-gain selecting portion 17 selects the correction gain to be used when performing shading correction on the image to be corrected, which is obtained by the microscope 1. More specifically, in the case where a plurality of correction gains that are associated with optical information in common with the optical information at the time of obtaining the image to be corrected are stored in the correction-gain storage portion 5, from this plurality of correction gains, the correction-gain selecting portion 17 selects, on the basis of the specimen information, a correction gain to be used in shading correction of the image to be corrected. In this embodiment, the correction gain to be used in shading correction of the image to be corrected is selected by using a histogram of the pixel values in the image as the specimen information.

The term "having common optical information" includes, of course, the case where the optical information of the image to be corrected and all of the optical information associated with the correction gains stored in the correction-gain storage portion match, and also the case where they partially match, for example, where only the information related to the microscopy method and objective lens match.

The shading correcting portion 18 performs shading correction on the image to be corrected, in accordance with the correction gain selected by the correction-gain selecting portion 17, and obtains an image in which shading has been corrected.

Figure 2:
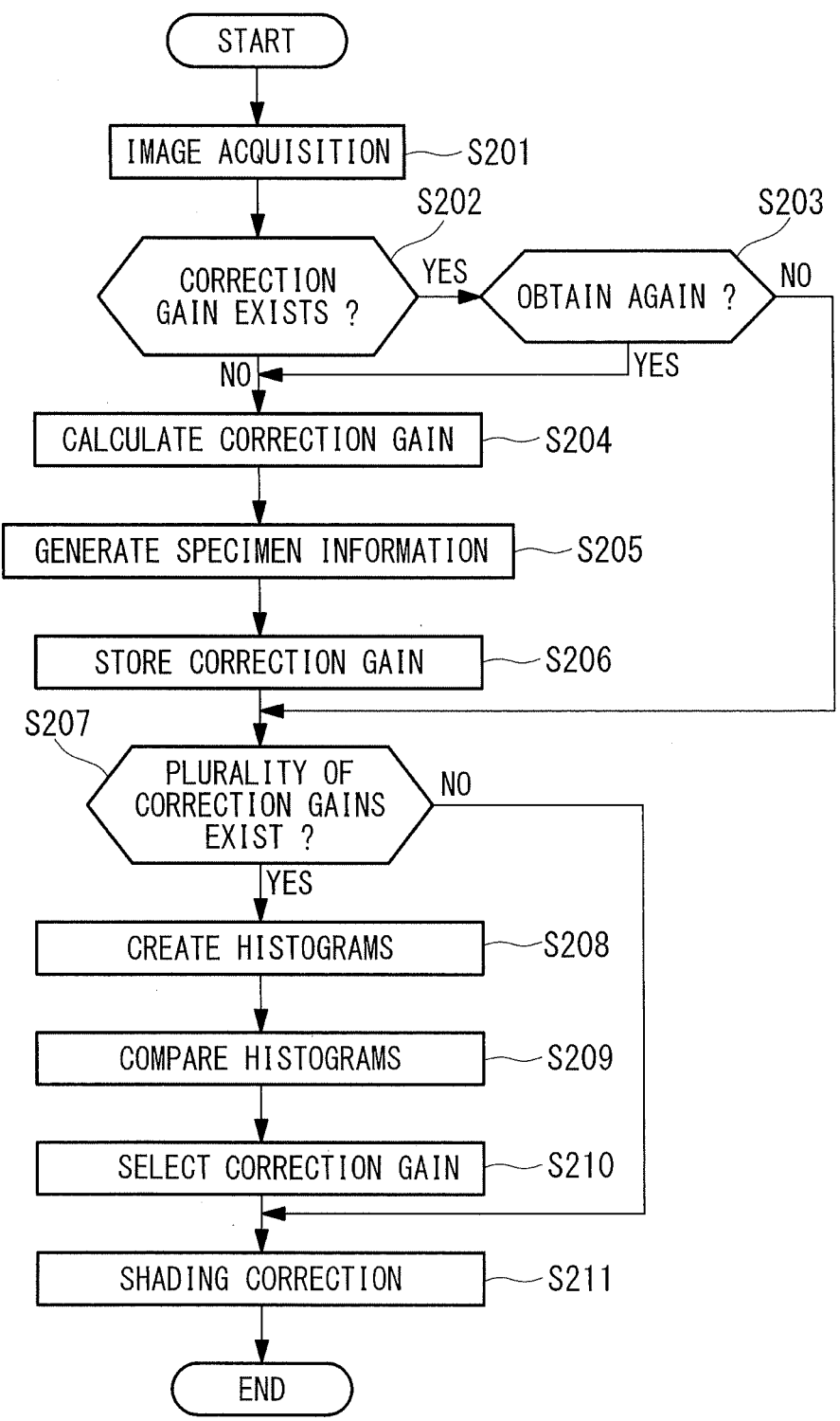
FIG. 2 is a flowchart of shading correction in the microscope system according to the first embodiment of the present invention.

The flow of shading correction performed by the thus-configured microscope system will be described below by following the flowchart in FIG. 2.

Figure 3D:
FIG. 3D is an explanatory diagram showing an example of a standard-viewing-field image and an edge-viewing-field image.

In step S201, the image-acquisition control portion 21 gives an instruction to acquire an optical image of the specimen A to the image-acquisition portion 10 according to an instruction from the computer 3, and upon receiving this instruction, the image-acquisition portion 10 acquires a standard-viewing-field image shown in FIG. 3A as the image to be corrected, and the image-acquisition control portion 21 performs development processing and outputs the result to the image processing portion 4.

In Step S202, the computer 3 determines whether there is a correction gain stored in the correction-gain storage portion 5 in association with the optical information in common with the optical information at the time of acquiring the image to be corrected, in other words, a correction gain having optical information in common with that of the image to be corrected. If a correction gain having common optical information exists, the process proceeds to step S203, and in step S203, it is determined whether or not to newly calculate a correction gain for the image to be corrected.

In the case where, in step S202, a correction gain having common optical information does not exist, or in the case where, in step S203, there is an instruction from the computer 3 to calculate a correction gain, for example, an instruction given by a user, then in step S204, calculation of a correction gain for the image to be corrected is performed. On the other hand, in step S203, in the case where there is no instruction from the computer 3 to calculate a correction gain, the process proceeds to step S207, described below.

In step S204, correction gain calculation is performed, for example, as follows. The stage 8 is driven by the driving-mechanism control portion 20 to make the specimen A and the image-acquisition portion 10 move relative to each other, and a standard-viewing-field image, which is the image to be corrected, and a prescribed region inside this standard-viewing-field image are overlapped while forming different viewing-field ranges, so that a plurality of edge-viewing-field images are acquired. As the edge-viewing-field images, for example, a configuration in which four images are acquired while shifting them with respect to the standard-viewing-field image by about ⅓ of the image size is possible.

Specifically, in FIGS. 3A to 3E, a standard-viewing-field image 301 and edge-viewing-field images 302, 303, 304, and 305 are assumed. Moreover, in contrast to each of the edge-viewing-field images 302, 303, 304, and 305 in FIGS. 3B to 3E, the standard-viewing-field image 301 is indicated by the broken line.

Figure 3E:
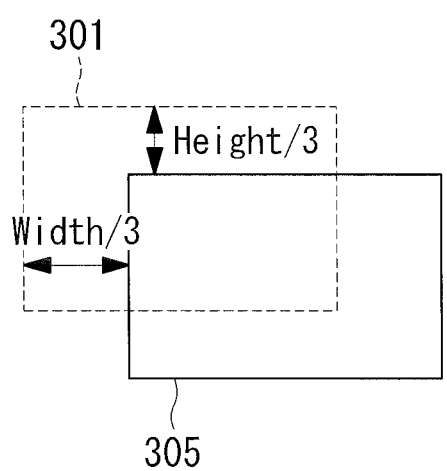
FIG. 3E is an explanatory diagram showing an example of a standard-viewing-field image and an edge-viewing-field image.

In other words, after the standard-viewing-field image 301 is acquired (FIG. 3A), the stage 8 is driven to the right (for example, the Y direction) by one-third of the image width of the standard-viewing-field image to acquire the edge-viewing-field image 302 (FIG. 3B), the stage 8 is driven downward (for example, the X direction) by one-third of the image height of the standard-viewing-field image and to the left by one-third of the image width thereof to acquire the edge-viewing-field image 303 (FIG. 3C), the stage 8 is driven downward by one-third of the image height of the standard-viewing-field image to acquire the edge-viewing-field image 304 (FIG. 3D), and finally the stage 8 is driven to the right by one-third of the image width of the standard-viewing-field image and downward by one-third of the image height thereof to acquire the edge-viewing-field image 305 (FIG. 3E).

Note that the order in which each of the edge-viewing-field images is acquired is arbitrary, and the relative positional relationship between the standard-viewing-field image 301 and the edge-viewing-field images 302 to 305 may be reversed. Width in FIGS. 3A to 3E indicates the image width, and Height indicates the image height. Based on the standard-viewing-field image and the edge-viewing-field images acquired in this way, there is almost no shading at the center of the viewing field, and therefore, the correction gain is calculated based on the ratio of the brightnesses of the images in which the center and the peripheries overlap.

Next, in step S205, specimen information is generated for the image to be corrected. In other words, an entered specimen name related to the image to be corrected is received by the specimen-information generating portion 15, and a histogram of the pixel values of the image to be corrected is generated. In the case where the image to be corrected is a color image having RGB elements, a histogram is calculated for each color. Since the histogram is used as the specimen information indicating features of the specimen, instead of a histogram, it is possible to use information that indicates features of the image to be corrected, for example, the variance of the pixel values of the image to be corrected.

In step S206, the optical information and the specimen information at the time of acquiring the image to be corrected, which is input from the microscope 1, are stored in the correction-gain storage portion 5 in association with the correction gain of the image to be corrected, which was calculated in the preceding step.

In step S207, it is determined whether a plurality of correction gains associated with the optical information in common with the optical information of the image to be corrected are stored in the correction-gain storage portion 5. If, as a result of this determination, a plurality of such correction gains do not exist, in other words, if a single such correction gain is stored in the correction-gain storage portion 5, in step S211, shading correction is performed on the image to be corrected, using this correction gain.

On the other hand, in the determination at step S207, if it is determined that a plurality of correction gains having common optical information exist, the process proceeds to step S208, where histogram for the image to be corrected are generated. If specimen information has been generated in step S205 for the image to be corrected, a histogram has already been calculated, and therefore, the already calculated histogram is used as is.

In step S209, the histogram for the image to be corrected, which is calculated in step S208, and histograms related to the plurality of correction gains having common optical information, which are stored in the correction-gain storage portion 5, are compared by the correction-gain selecting portion 17, and their degree of similarity is determined. The determination of the degree of similarity of the histograms is performed, for example, as follows.

With the histogram of the image to be corrected defined as $H_{ref}$ and the histograms of the correction gains having common optical information, which are stored in the correction-gain storage portion, defined as $H_k$, the degree of similarity, $d(H_{ref}, H_k)$, between the histogram $H_{ref}$ of the image to be corrected and the histogram for the k-th correction gain from among the correction gains having common optical information, which are stored in the correction-gain storage portion, can be determined by the crossover method represented by Equation (1) below.

[Equation 1]

$$d(H_{ref}, H_k) = \sum_{i=0}^{N} \min(H_{ref}(i), H_k(i)) \quad (1)$$

Here, i is the pixel value, N is the maximum pixel value, and $H_{ref}(i)$ and $H_k(i)$ are the numbers of pixels having pixel value i, $d(H_{ref}, H_k)$, and it can be determined that the histogram for the correction gain that maximizes $d(H_{ref}, H_k)$ is most similar to the histogram for the image to be corrected. Therefore, the correction gain that maximizes $d(H_{ref}, H_k)$ serves as a candidate correction gain to be used in the shading correction.

The calculation of the degree of similarity is not limited thereto, and a known method, such as correlation, $\chi^2$, the Bhattacharyya distance or the like may be used.

The correction-gain selecting portion 17 can present correction gain options to the user by displaying on the monitor 23 specimen names for all of the corrections gains having common optical information with that of the image to be corrected. When displaying these correction gains, they can be displayed in order of decreasing histogram similarity, or correction gains for which the histograms are most similar can be displayed as suggested candidates, on the basis of the results of comparing the histograms.

In step S211, the correction gain selected in step S210 is used to perform shading correction of the image to be corrected. The user may make a selection from the displayed candidates, or a correction gain input via a keyboard 24 or mouse 25 may be selected.

Thus, with the microscope system according to this embodiment, in the case where correction gains associated with the optical information in common with that of the image to be corrected, which is obtained by the microscope 1, are stored in the correction-gain storage portion 5, the correction-gain selecting portion 17 can select, from the stored correction gains, the correction gain to be used in shading correction. In particular, in the case where a plurality of correction gains associated with optical information in common with the optical information at the time of obtaining the image to be corrected are stored, the correction gain that maximizes the degree of similarity of the histograms serving as the specimen information can be selected from this plurality of correction gains by the correction-gain selecting portion 17 as the correction gain to be used in shading correction of the image to be corrected.

Therefore, when an optical image of the specimen is acquired by the microscope to obtain the image to be corrected, it is not always necessary to calculate the correction gain each time, and it is possible to use a correction gain that is stored in the correction-gain storage portion 5. In addition, in the case where there are a plurality of correction gain candidates to be used, by selecting the most appropriate correction gain, it is possible to perform shading correction simply and effectively.

Second Embodiment

In the following, a second embodiment of the present invention will be described.

In the microscope system according to this embodiment, the procedure in the case when the correction gain to be used in shading correction is selected from the plurality of correction gains stored in the correction-gain storage portion by the correction-gain selecting portion 17 differs from that in the microscope system according to the first embodiment described above.

Specifically, in the microscope system according to this embodiment, in the case where a plurality of correction gains associated with optical information in common with the optical information at the time of obtaining the image to be corrected are stored, the correction-gain selecting portion 17 performs shading correction of the image to be corrected using the plurality of correction gains having common optical information and selects the correction gain to be used in the shading correction of the image to be corrected on the basis of the correction results thereof.

Figure 4:
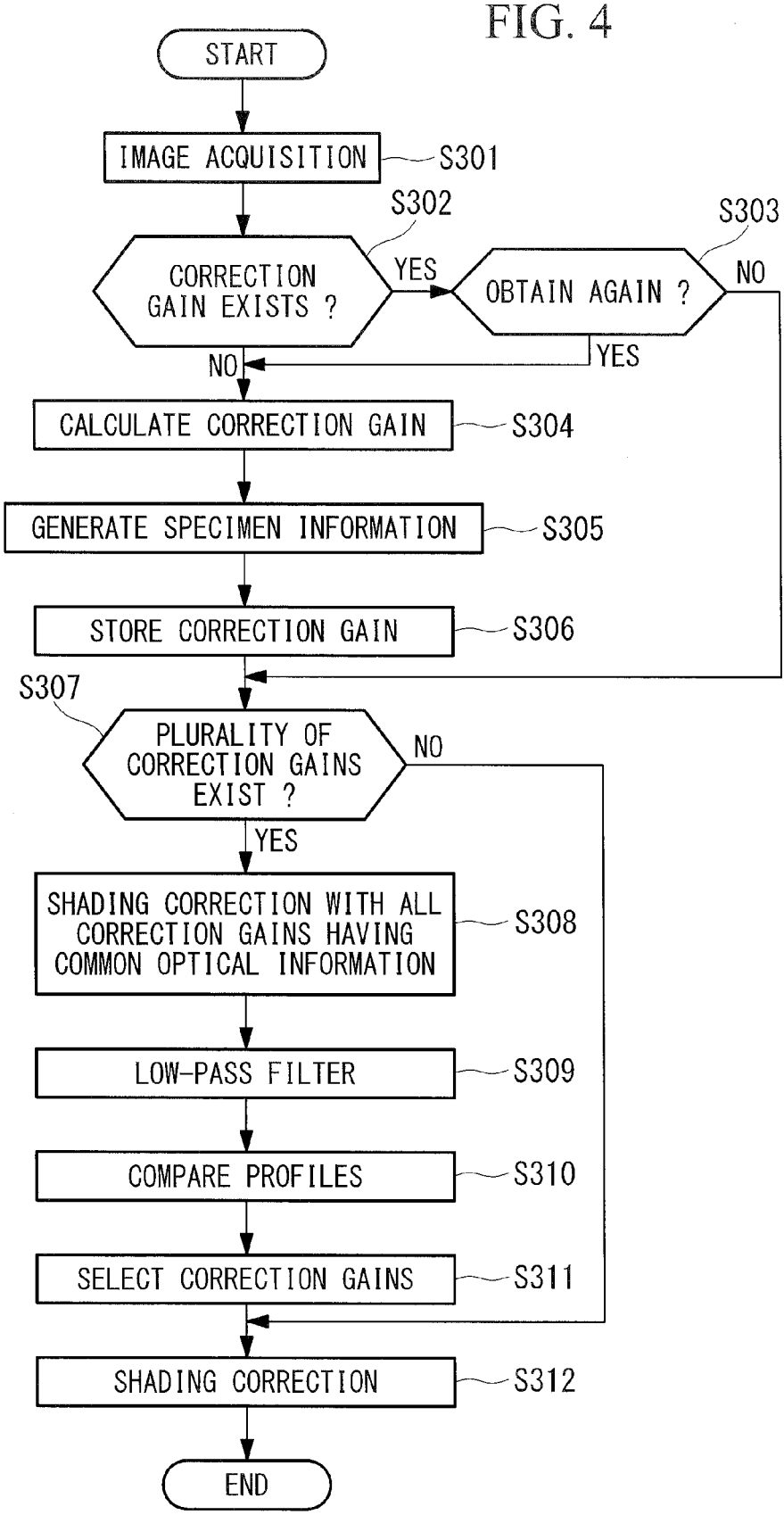
FIG. 4 is a flowchart of shading correction in a microscope system according to a second embodiment of the present invention.

Since the microscope system according to this embodiment has substantially the same configuration as the first embodiment described above, a description of each structure is omitted, and the flow of shading correction will be described by following the flowchart in FIG. 4.

In step S301, the image-acquisition portion 10, which receives an image acquisition instruction from the computer 3 via the image-acquisition control portion 21, acquires the standard-viewing-field image shown in FIG. 3A as the image to be corrected, and the image-acquisition control portion 21 performs development processing in and outputs the result to the image processing portion 4.

In step S302, the computer 3 determines whether a correction gain having optical information in common with that of the image to be corrected is stored in the correction-gain storage portion 5. If a correction gain having common optical information exists, the process proceeds to step S303, and in step S303, it is determined whether a correction gain should be newly calculated for the image to be corrected.

In the case where, in step S302, a correction gain having common optical information does not exist, or in the case where, in step S303, there is an instruction from the computer 3 to calculate a correction gain, for example, an instruction given by a user, then in step S304, calculation of a correction gain for the image to be corrected is performed. On the other hand, in step S303, in the case where there is no instruction from the computer 3 to calculate a correction gain, the process proceeds to step S307, described below. The calculation of the correction gain is performed using the same procedure as the calculation of the correction gain in the first embodiment described above.

Next, in step S305, specimen information is generated for the image to be corrected. In other words, an entered specimen name related to the image to be corrected is received by the specimen-information generating portion 15.

In step S306, optical information at the time of acquiring the image to be corrected, which is input from the microscope 1, and specimen information are stored in the correction-gain storage portion 5 in association with the correction gain for the image to be corrected, which is calculated in the previous step.

In step S307, it is determined whether a plurality of correction gains associated with the optical information in common with the optical information of the image to be corrected are stored in the correction-gain storage portion 5. If, as a result of this determination, a plurality of such correction gains do not exist, in other words, if a single such correction gain is stored in the correction-gain storage portion 5, in step S312, shading correction is performed on the image to be corrected, using this correction gain.

On the other hand, in the determination in step S307, if it is determined that a plurality of correction gains having common optical information do exist, the process proceeds to step S308, where shading correction of the image to be corrected is performed using all of the correction gains having common optical information.

In step S309, the correction-gain selecting portion 17 applies a low-pass filter to each of the images subjected to shading correction. As the low-pass filter, it is possible to use, for example, an averaging filter expressed by Equation (2) below.

[Equation 2]

$$f(x, y) = \frac{1}{MN} \sum_{j=-M}^{M} \sum_{i=-N}^{N} I(x+i, y+i) \qquad (2)$$

Here, f(x,y) is the pixel value at coordinates (x,y) after applying the averaging filter, I(x,y) is the pixel value at coordinates (x,y), and M and N are the filter size in the x-direction and the filter size in the y-direction, respectively. The filter sizes should be set to sufficiently large sizes relative to the image size; for example, it is possible to set N=M=300. The low-pass filter is not limited to an averaging filter, and a known method may be used, such as a Gaussian filter, or applying a low-pass filter to the results of Fourier transformation, followed by inverse Fourier transformation.

Next, in step S310, the variance of a diagonal line profile in each image subjected to low-pass filter processing is calculated by the correction-gain selecting portion 17, and in step S311, the correction gain having the smallest variance is selected as a candidate correction gain for eventual use in the shading correction.

In step S312, shading correction of the image to be corrected is performed using the correction gain selected by the correction-gain selecting portion 17.

With the microscope system according to this embodiment, in the case where correction gains associated with optical information in common with that of the image to be corrected, which is obtained by the microscope 1, are stored in the correction-gain storage portion 5, the correction-gain selecting portion 17 can select, from the stored correction gains, a correction gain for use in shading correction. In particular, in the case where a plurality of correction gains associated with optical information in common with the optical information at the time of obtaining the image to be corrected are stored, a correction gain for use in the shading correction of the image to be corrected can be selected from this plurality of correction gains by the correction-gain selecting portion 17, based on the results of shading correction with the plurality of correction gains, in other words, based on the variances of the respective line profiles of the images according to the results of the shading correction.

Therefore, when acquiring optical images of the specimen with the microscope to obtain the image to be corrected, it is not always necessary to calculate the correction gain each time, and it is possible to use a correction gain that is stored in the correction-gain storage portion 5. In addition, in the case where there are a plurality of correction gain candidates to be used, by selecting the most appropriate correction gain, it is possible to perform shading correction simply and effectively.

Each aspect of the present invention as stated below leads the above embodiments.

An aspect of the present invention provides a microscope system including a microscope that acquires an optical image of a specimen to obtain an image; a correction-gain calculating portion that calculates a correction gain for performing shading correction of the image obtained by the microscope; a correction-gain storage portion that stores specimen information indicating features of the specimen and optical information at the time of obtaining the image in association with the correction gain calculated by the correction-gain calculating portion; a correction-gain selecting portion that selects the correction gain for use when performing the shading correction of the image to be corrected, which is obtained by the microscope; and a correction portion that performs the shading correction of the image to be corrected, on the basis of the correction gain selected by the correction-gain selecting portion, wherein, in a case where a plurality of the correction gains associated with optical information in common with the optical information at the time of obtaining the image to be corrected are stored in the correction-gain storage portion, on the basis of the specimen information or correction results obtained by performing the shading correction with the plurality of correction gains, the correction-gain selecting portion selects, from the plurality of correction gains associated with the optical information in common with the optical information at the time of obtaining the image to be corrected, the correction gain to be used in the shading correction of the image to be corrected.

With this aspect, optical images of the specimen are acquired by the microscope to obtain an image. For the obtained image, a correction gain to be used in shading correction is calculated by the correction-gain calculating portion, and the calculated correction gain is stored in the correction-gain storage portion in association with the optical information at the time of obtaining the image and specimen information. In the case where a correction gain associated with optical information in common with that of the image to be corrected, which is obtained by the microscope, is stored in the correction-gain storage portion, it is possible to select, from the correction gains stored in the correction-gain storage portion, a correction gain to be used in shading correction. Here, in the case where a plurality of correction gains associated with optical information in common with that of the optical information at the time of obtaining the image to be corrected are stored, a correction gain to be used in shading correction of the image to be corrected is selected by the correction-gain selecting portion from among this plurality of correction gains on the basis of the specimen information or the results of the shading correction using the plurality of correction gains.

Therefore, when optical images of the specimen are acquired by the microscope to obtain the image to be corrected, it is not always necessary to calculate a correction gain each time, and it is possible to use a correction gain that is stored in the correction-gain storage portion. In addition, in the case where there are a plurality of correction gains to be used, by selecting the most appropriate correction gain, it is possible to perform shading correction simply and effectively.

In the above-described aspect, the microscope may include a stage on which the specimen is mounted; an optical system that forms an image of the specimen; a driving portion that moves the specimen and the optical system relative to each other by driving at least one of the optical system and the stage; and an image-acquisition portion that acquires a standard-viewing-field image, which is an image of a prescribed viewing-field range of the specimen, and that relatively moves, with the driving portion, the position of the specimen with respect to the optical system to acquire a plurality of edge-viewing-field images, which include a prescribed region inside the prescribed viewing-field range and which are images of edge-viewing-field ranges that each differ from the prescribed viewing-field range, wherein the correction-gain calculating portion may calculate a correction gain of each pixel in the standard-viewing-field image on the basis of the standard-viewing-field image and the edge-viewing-field images.

By doing so, by acquiring an image of a region where shading at the center of the image does not become a problem and a plurality of edge-viewing-field images, it is possible to calculate a preferable correction gain on the basis of brightness variations.

In the above-described aspect, from among the plurality of correction gains associated with optical information in common with optical information at the time of obtaining the image to be corrected, the correction-gain selecting portion may select, on the basis of a degree of similarity between the specimen information at the time of calculation of the correction gains and specimen information of the image to be corrected, the correction gain to be used in shading correction of the image to be corrected.

By doing so, it is possible to select the optimal correction gain for the shading correction of the image to be corrected.

In the above-described aspect, from among the plurality of correction gains associated with the optical information in common with the optical information at the time of obtaining the image to be corrected, the correction-gain selecting portion may select a correction gain that maximizes the shading correction effect as the correction gain to be used in the shading correction of the image to be corrected.

By doing so, it is possible to select the optimal correction gain for shading correction of the image to be corrected.

The above-described aspect may further include a display portion that displays candidates of correction gains to be used in shading correction of the image to be corrected, from among the plurality of correction gains associated with the optical information in common with the optical information at the time of obtaining the image to be corrected.

By doing so, it is possible to present the user with candidate correction gains for use in the shading correction.

REFERENCE SIGNS LIST

1 Microscope
2 Control portion
3 Computer (PC)
4 Image processing portion
15 Specimen-information generating portion
16 Correction-gain calculating portion
17 Correction-gain selecting portion
18 Shading correcting portion
20 Driving-mechanism control portion
21 Image-acquisition control portion

The invention claimed is:
1. A microscope system comprising:
a microscope configured to:
  acquire an optical image of a specimen; and
  acquire an image-to-be-corrected based on the optical image; and
a computer configured to:
  access a storage configured one or more candidate shading correction values for performing shading correction of the image-to-be-corrected, wherein each of the one or more candidate shading correction values is stored in association with:
    optical information related to optical conditions of the microscope at a time of acquiring a candidate optical image of a candidate specimen and generating a candidate image from which the each of the one or more candidate shading correction values is determined; and
    specimen information of the candidate specimen;
  perform a first comparison between optical information related to optical conditions of the microscope at a time of acquiring the image-to-be-corrected with the optical information stored with the each of the one or more candidate shading correction values in the storage;
  (1) when a result of the first comparison is that one optical information in common with the optical information related to the optical conditions of the microscope at the time of acquiring the image-to-be-corrected is stored in the storage, perform the shading correction of the image-to-be-corrected with the one shading correction value stored in association with the stored one optical information;
  (2) when the result of the first comparison is that a plurality of optical information in common with the optical information related to the optical conditions of the microscope at the time of acquiring the image-to-be-corrected are stored in the storage:
    perform a second comparison between specimen information of the specimen of which the optical image is acquired with the plurality of specimen information stored in association with the plurality of optical information;
    select one of the plurality of candidate shading correction values based on a result of the second comparison; and
    perform the shading correction of the image-to-be-corrected with the one of the plurality of shading correction values selected; and
  (3) when the result of the first comparison is that no optical information in common with the optical information related to the optical conditions of the microscope at the time of acquiring the image-to-be-corrected is stored in the storage:
    calculate a new shading correction value for the image-to-be-corrected; and
    control the storage to store the new shading correction value in association with the specimen information of the specimen of which the optical image is acquired and the optical information related to the optical conditions of the microscope at the time of acquiring the image-to-be-corrected.

2. The microscope system according to claim 1,
wherein the microscope comprises:
  a stage on which the specimen is mounted;
  an optical system configured to form the optical image of the specimen;
  an actuator configured to move the specimen and the optical system relative to each other by driving at least one of the optical system and the stage; and
  an image sensor configured to:
    acquire a standard-viewing-field image as the image-to-be-corrected, wherein the standard-viewing-field image is an image of a prescribed viewing-field range of the specimen; and
    be moved along with relative movement of the specimen and the optical system by the actuator while acquiring a plurality of edge-viewing-field images, wherein each of the plurality of edge-viewing-field images comprises a prescribed region inside the prescribed viewing-field range, and wherein the plurality of edge-viewing-field images are images of edge-viewing-field ranges that each differ from the prescribed viewing-field range, and
wherein the computer is configured to determine the one or more shading correction values based on the standard-viewing-field image and the plurality of edge-viewing-field images, wherein the each of the one or more shading correction values comprises a shading correction value for performing shading correction of at least a pixel of the standard-viewing-field image.

3. The microscope system according to claim 1, wherein the computer is configured to perform the second comparison by comparing a degree of similarity between the specimen information of the specimen of which the optical image is acquired with the plurality of specimen information stored in association with the plurality of optical information.

4. The microscope system according to claim 1, wherein the computer is configured to:
perform the second comparison to determine a shading correction value of the plurality of shading correction values that maximizes a shading correction effect; and
select the one of the plurality of candidate shading correction values to be the shading correction value by selecting the shading correction value of the plurality of shading correction values determined to maximize the shading correction effect.

5. The microscope system according to claim 1, wherein the computer is configured to control a display to display one or more of:
the plurality of specimen information stored in association with each of the plurality of candidate shading correction values; and
the result of the second comparison.

6. A method comprising:
acquiring, by a microscope, an optical image of a specimen; and
acquiring, by the microscope, an image-to-be-corrected based on the optical image;
accessing a storage configured to store one or more candidate shading correction values for performing shading correction of the image-to-be-correction, wherein each of the one or more candidate shading correction values is stored in association with:
optical information related to optical conditions of the microscope at a time of acquiring a candidate optical image of a candidate specimen and generating a candidate image from which the each of the one or more candidate shading correction values is determined; and
specimen information of the candidate specimen;
performing a first comparison between optical information related to optical conditions of the microscope at a time of acquiring the image-to-be-corrected with the optical information stored with the each of the one or more candidate shading correction values in the storage;
(1) when a result of the first comparison is that one optical information in common with the optical information related to the optical conditions of the microscope at the time of acquiring the image-to-be corrected is stored in the storage, performing the shading correction of the image-to-be-corrected with the one shading correction value stored in association with the stored one optical information;
(2) when the result of the first comparison is that a plurality of optical information in common with the optical information related to the optical conditions of the microscope at the time of acquiring the image-to-be-corrected are stored in the storage:
performing a second comparison between specimen information of the specimen of which the optical image is acquired with the plurality of specimen information stored in association with the plurality of optical information;
selecting one of the plurality of candidate shading correction values based on a result of the second comparison; and
performing the shading correction of the image-to-be-corrected with the one of the plurality of shading correction values selected; and
(3) when the result of the first comparison is that no optical information in common with the optical information related to the optical conditions of the microscope at the time of acquiring the image-to-be-corrected is stored in the storage:
calculating a new shading correction value for the image-to-be-corrected; and
control the storage to store the new shading correction value with the specimen information of the specimen of which the optical image is acquired and the optical information related to the optical conditions of the microscope at the time of acquiring the image-to-be corrected.

7. The method according to claim 6, wherein the microscope comprises:
a stage on which the specimen is mounted;
an optical system configured to form the optical image of the specimen;
an actuator configured to move the specimen and the optical system relative to each other by driving at least one of the optical system and the stage; and
an image sensor configured to:
acquire a standard-viewing-field image as the image-to-be-corrected, wherein the standard-viewing-field image is an image of a prescribed viewing-field range of the specimen; and
be moved along with relative movement of the specimen and the optical system by the actuator while acquiring a plurality of edge-viewing-field images, wherein each of the plurality of edge-viewing-field images comprises a prescribed region inside the prescribed viewing-field range, and wherein the plurality of edge-viewing-field images are images of edge-viewing-field ranges that each differ from the prescribed viewing-field range, and
wherein determining the one or more shading correction values comprises determining the one or more shading correction values based on the standard-viewing-field image and the plurality of edge-viewing-field images, wherein the each of the one or more shading correction values comprises a shading correction value for performing shading correction of at least a pixel of the standard-viewing-field image.

8. The method according to claim 6, wherein the second comparison is performed by comparing a degree of similarity between the specimen information of the specimen of which the optical image is acquired with the plurality of specimen information stored in association with the plurality of optical information.

9. The method according to claim 6, wherein the second comparison is performed to determine a shading correction value of the plurality of shading correction values that maximizes a shading correction effect, and
wherein selecting the one of the plurality of candidate shading correction values to be the shading correction value comprises selecting the shading correction value of the plurality of shading correction values determined to maximize the shading correction effect.

10. The method according to claim 6, further comprising: controlling a display to display one or more of:
the plurality of specimen information stored in association with each of the plurality of candidate shading correction values; and
the result of the second comparison.

11. A computer readable storage device storing instructions for processing an image-to-be corrected acquired by a microscope based on an optical image acquired by the microscope, wherein the instructions, when executed by a processor, cause the processor to:
access a storage configured to store one or more candidate shading correction values for performing shading correction of the image-to-be-corrected, wherein each of the one or more candidate shading correction values is stored in association with:
optical information related to optical conditions of the microscope at a time of acquiring a candidate optical image of a candidate specimen and generating a candidate image from which the each of the one or more candidate shading correction values is determined; and
specimen information of the candidate specimen;
perform a first comparison between the optical information related to optical conditions of the microscope at a time of acquiring the image-to-be-corrected with the optical information stored with the each of the one or more candidate shading correction values in the storage;
(1) when a result of the first comparison is that one optical information in common with the optical information related to the optical conditions of the microscope at the time of acquiring the image-to-be-corrected is stored in the storage, perform the shading correction of the image-to-be-corrected with the one shading correction value stored in association with the stored one optical information;
(2) when the result of the first comparison is that a plurality of optical information in common with the optical information related to the optical conditions of the microscope at the time of acquiring the image-to-be-corrected are stored in the storage:
perform a second comparison between specimen information of the specimen of which the optical image is acquired with the plurality of specimen information stored in association with the plurality of optical information;
select one of the plurality of candidate shading correction values based on a result of the second comparison; and
perform the shading correction of the image-to-be-corrected with the one of the plurality of shading correction values selected; and
(3) when the result of the first comparison is that no optical information in common with the optical information related to the optical conditions of the microscope at the time of acquiring the image-to-be-corrected is stored in the storage:
calculate a new shading correction value for the image-to-be-corrected; and
control the storage to store the newly shading correction value in association with the specimen information of the specimen of which the optical image is acquired and the optical information related to the optical conditions of the microscope at the time of acquiring the image-to-be-corrected.

12. The computer readable storage device according to claim 11,
wherein the microscope comprises:
a stage on which the specimen is mounted;
an optical system configured to form the optical image of the specimen;
an actuator configured to move the specimen and the optical system relative to each other by driving at least one of the optical system and the stage; and
an image sensor configured to:
acquire a standard-viewing-field image as the image-to-be-corrected, wherein the standard-viewing-field image is an image of a prescribed viewing-field range of the specimen; and
be moved along with relative movement of the specimen and the optical system by the actuator while acquiring a plurality of edge-viewing-field images, wherein each of the plurality of edge-viewing-field images comprises a prescribed region inside the prescribed viewing-field range, and wherein the plurality of edge-viewing-field images are images of edge-viewing-field ranges that each differ from the prescribed viewing-field range, and
wherein the instructions cause the processor to determine the one or more shading correction values based on the standard-viewing-field image and the plurality of edge-viewing-field images, wherein the each of the one or more shading correction values comprises a shading correction value for performing shading correction of at least a pixel of the standard-viewing-field image.

13. The computer readable storage device according to claim 11,
wherein the instructions cause the processor to perform the second comparison by comparing a degree of similarity between the specimen information of the specimen of which the optical image is acquired with the plurality of specimen information stored in association with the plurality of optical information.

14. The computer readable storage device according to claim 11,
wherein the instructions cause the processor to:
perform the second comparison to determine a shading correction value of the plurality of shading correction values that maximizes a shading correction effect, and
select the one of the plurality of candidate shading correction values to be the shading correction value of the plurality of shading correction values determined to maximize the shading correction effect.

15. The computer readable storage device according to claim 11,
wherein instructions cause the processor to control a display to display one or more of:
the plurality of specimen information stored in association with each of the plurality of candidate shading correction values; and
the result of the second comparison.

* * * * *